UNITED STATES PATENT OFFICE.

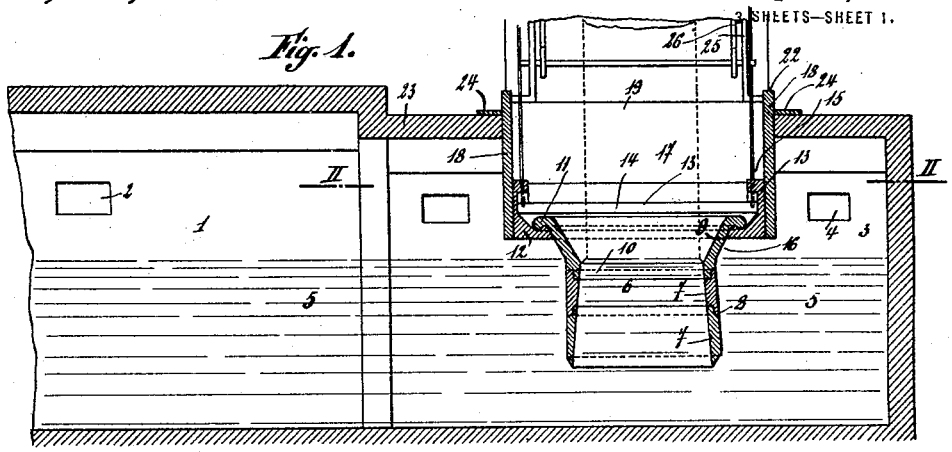
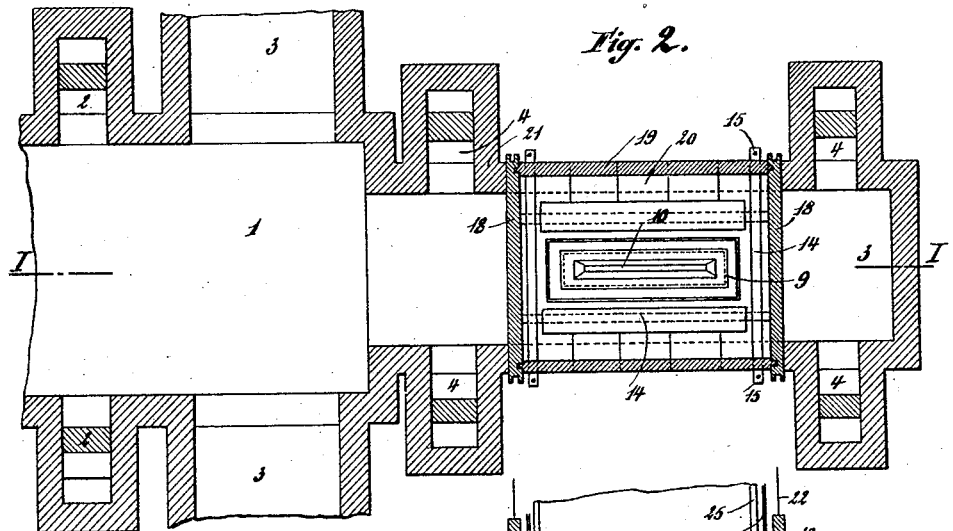
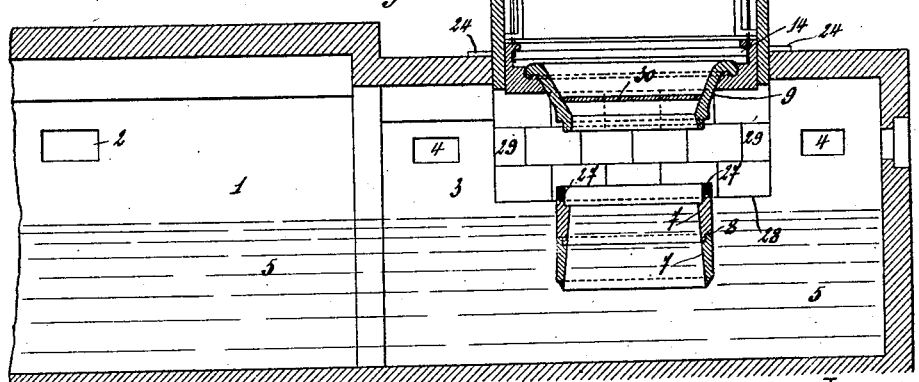

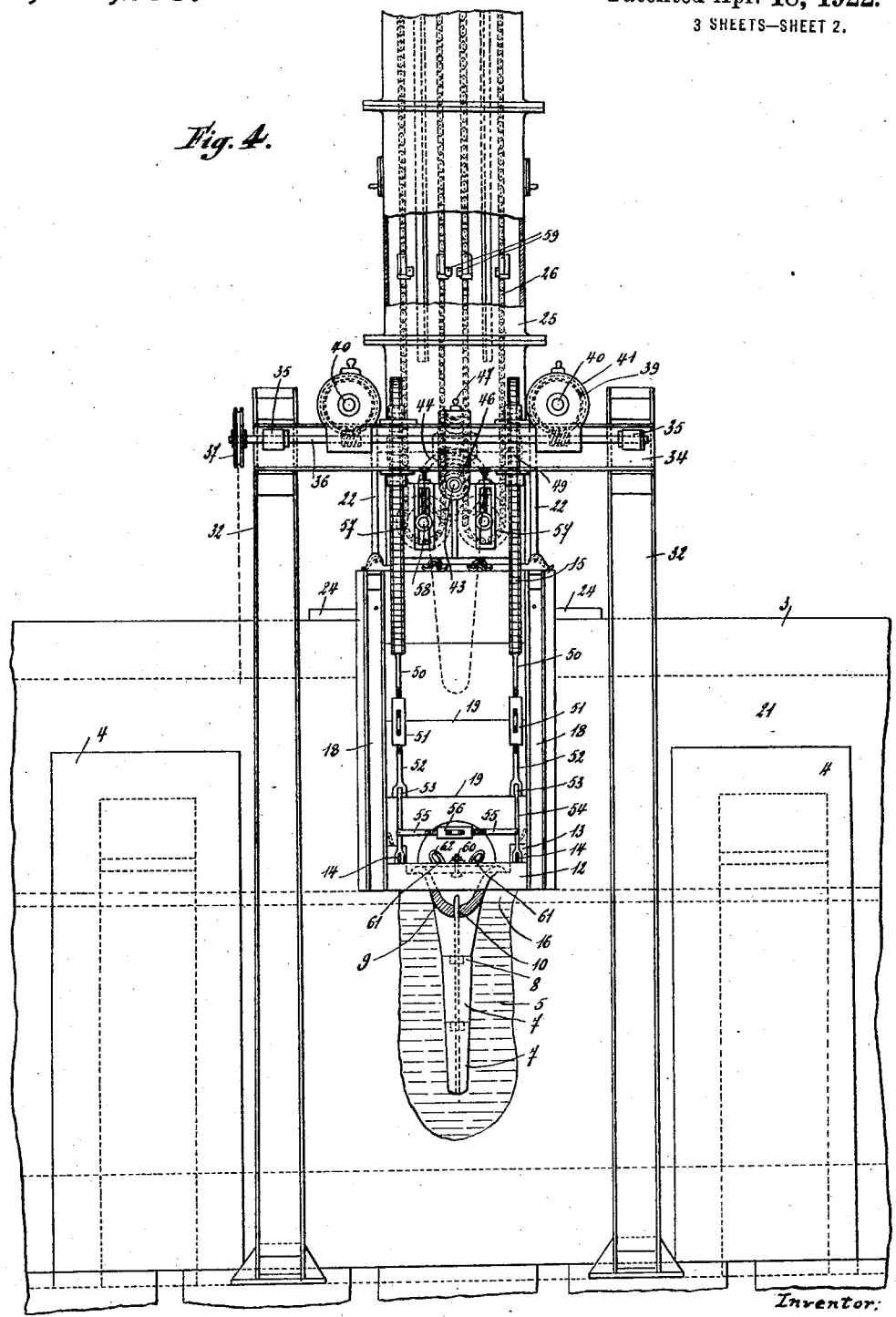

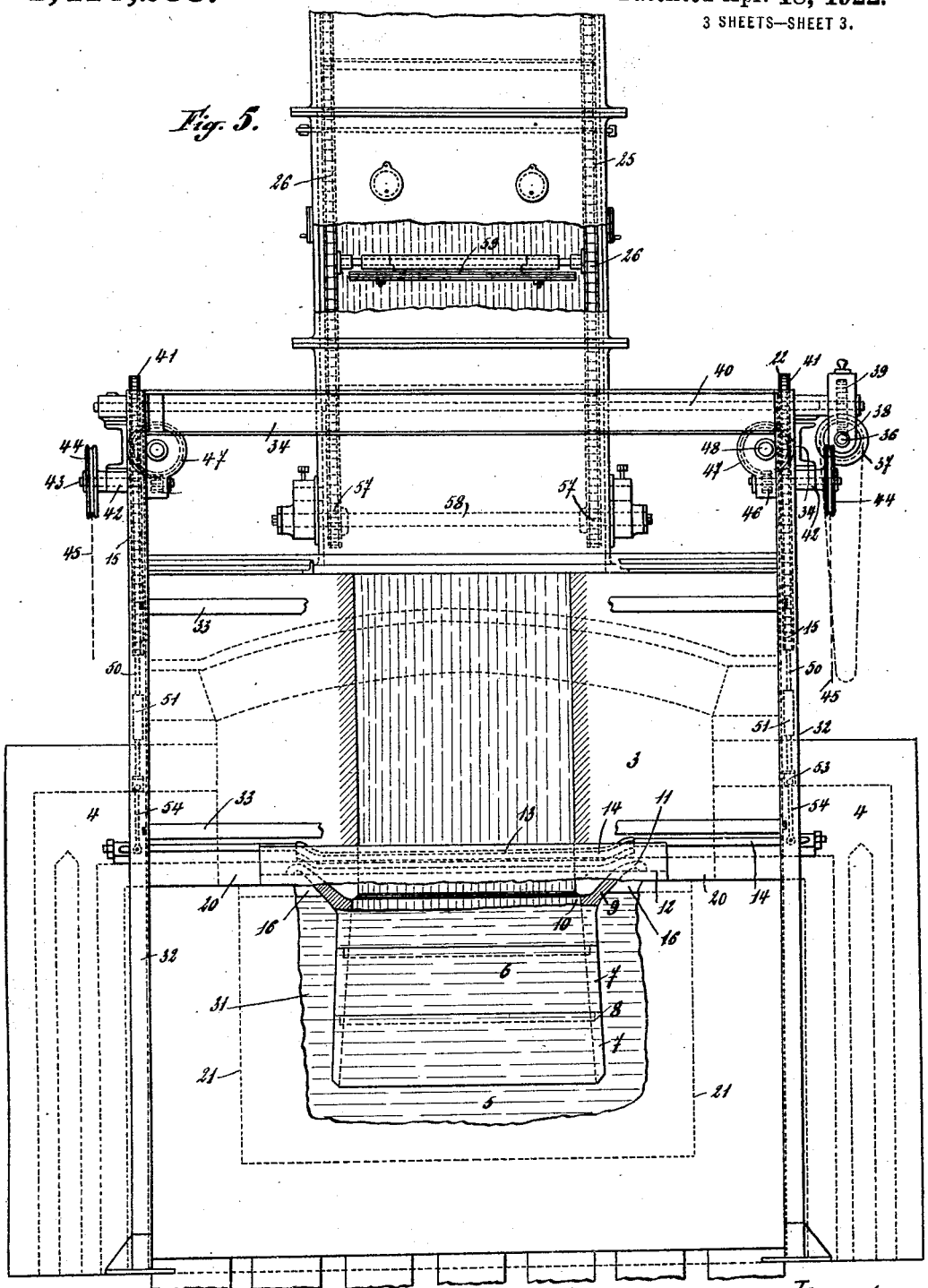

EUGÈNE ROWART, OF AUVELAIS, BELGIUM.

APPARATUS FOR THE MANUFACTURE OF GLASS IN CONTINUOUS SHEETS.

1,413,238.      Specification of Letters Patent.     Patented Apr. 18, 1922.

Application filed October 27, 1919. Serial No. 333,509.

*To all whom it may concern:*

Be it known that I, EUGÈNE ROWART, a subject of the King of Belgium, residing at Auvelais, in the Kingdom of Belgium, have invented certain new and useful Improvements in Apparatus for the Manufacture of Glass in Continuous Sheets, of which the following is a specification.

This invention relates to improvements in apparatus for the manufacture of glass in continuous sheets and more particularly to that part of this apparatus which cooperates directly with the melting furnace containing the molten glass or with a chamber connected to this furnace and fed therefrom with molten glass.

In apparatus of this kind as hitherto proposed a device called "deliverer" is generally used and this device consists of a piece of refractory substance provided with a suitable slit or passage, floating on the molten glass or maintained therein so as to control the issue of the molten glass as it is moved upwards in the shape of a sheet by aid of a bait, sheet or plate which is introduced into the deliverer at the starting of the operation.

Great difficulties are met in constructions of this kind during the drawing of the sheet of glass on account of the impossibility of maintaining the flow of molten glass in most favourable conditions of chemical equilibrium for the drawing operation. Whether the deliverer be arranged in a fixed position or in the shape of a float, whether it is arranged in a chamber heated by special burners or in a channel communicating with the furnace, the plastic condition of the molten glass is soon modified on account of the cooling of the glass resulting from its contact with the apparatus or with unheated walls which are in contact with the atmosphere. As each special plastic condition of the molten glass corresponds to a given temperature, it is easy to understand that each modification of the temperature occurring in the part of the glass subjected to the drawing operation will produce corresponding modifications in the composition of the glass and consequently in the operating conditions.

To avoid these inconveniences special arrangements of delivering or taking apparatus have already been proposed, the deliverer dipping for instance to a given extent in the flow of molten glass so as to take the glass in a zone or flow which is less subjected to the variations of temperature.

These arrangements however have given no favourable results in practice for the reason that the upper zone or layer of the flow, on account of its gradual cooling and in the absence of suitable means adapted to maintain a constant degree or state of fluidity, soon causes a modification of the plastic condition of the flow in the zone in which the glass is taken in such a manner that, in spite of all cautions, the conditions of drawing are soon modified; the operation must then be stopped on account of the breaking of the glass-sheet and of the wastes resulting therefrom.

The improvements, forming the subject matter of my invention are for the purpose of avoiding these inconveniences. A first object of my invention is to secure means which will be adapted to maintain the whole mass of glass which is contained in the chamber where the glass is taken, at a high temperature surrounding on all sides the apparatus for taking the glass in such a manner that the upper layer of the flow will be maintained at a suitable fluidity.

Another object of my invention is to provide means for protecting the glass sheet in formation against this high temperature and a further object is to provide means for the taking of the glass at a suitable depth into the mass of molten glass, that is to say at the depth where it is in the most favourable state of physical and chemical equilibrium for the drawing operation and without that a modification can occur in the other parts of the molten glass.

A further object consists in providing means whereby, between different successive drawing operations, the heat, which is acting during the operation all round the taking apparatus, can also be used inside of this apparatus that is to say on the whole surface of the glass contained in the chamber where the glass is taken, this avoiding any adherence of solidified glass inside of the apparatus and contributing, in a great measure, in maintaining a constant degree of fluidity in the total area of upper layer of molten glass.

With these objects in view, my invention essentially consists in a special construction of the glass-taking apparatus and also in a special manner of utilizing said apparatus and in certain combinations of parts and elements which will be hereinafter fully described and pointed out in the appended claims.

Referring to the annexed drawings which show, as an example, two manners of carrying the invention into practice:

Figs. 1 to 3 show diagrammatically a first arrangement of apparatus.

Figs. 4 and 5 show a modified form in which some auxiliary and mechanical means are represented in a more concrete form.

Fig. 1 is a longitudinal vertical section of a part of a furnace for the production of molten glass and of a chamber, connected to the furnace and provided with an apparatus for taking the molten glass; said apparatus being constructed according to the invention and arranged longitudinally in the chamber. This figure corresponds to a section taken on line I—I in Fig. 2.

Fig. 2 is a horizontal section taken on line II—II in Fig. 1.

Fig. 3 is a section similar to that of Fig. 1 but showing the apparatus for the taking of the glass in its condition of rest between two successive drawing operations.

Fig. 4 is a side elevation, partly in section, at a larger scale of a chamber similar to that shown in Fig. 1 but with the taking apparatus arranged transversely in the chamber.

Fig. 5 is an end view of the chamber shown in Fig. 4, the end wall of the chamber being partly broken away so as to show the taking apparatus.

In all these figures the same reference characters refer to the same parts or elements.

Referring first to Figs. 1 to 3, 1 is a melting furnace for the production of molten glass; this furnace can be heated in any suitable way, for instance by aid of gas burners 2 and is combined with chambers 3, three of which are shown in the example. Each of these chambers is provided with an apparatus for the taking of glass one of which only is shown in its cooperation with the chamber 3 arranged coaxially with the furnace 1.

Each chamber 3 is provided with burners 4, four of which are shown in the example. These burners produce a high temperature above the mass of molten glass 5 which is at the same level in the furnace 1 and in the chambers 3, and maintain the glass in substantially the same condition as exists in the melting furnace.

An apparatus 6 for the taking of molten glass is placed between each pair of burners 4 at the ends of chamber 3; this apparatus 6 is arranged longitudinally in the chamber in the example of Figs. 1 to 3 but can also be arranged transversely in this chamber as it is shown in Figs. 4 and 5.

This taking apparatus comprises a kind of "dipping pipe" of rectangular shape formed of a number of pieces 7 in refractory material resting one upon another as indicated at 8 and of a top piece 9, flaring upwards and provided at its lower end with a rectangular slit 10 (Fig. 2). The top or upper piece 9 rests by an edge 11, which is curved so as to secure a joint, in a frame 12, also of refractory material. Two opposite sides of this frame are provided each with a groove 13 in which a rod or bar 14 is placed. The two rods 14 are connected at their ends to two transverse bars which are suspended to rods, chains or cables indicated diagrammatically at 15 and which are connected to a suitable lifting device. (Not shown in Figs. 1 to 3.)

The dimension or width of the refractory pieces 7 and 9 constituting the dipping-pipe or taking apparatus is such that the width of the apparatus is less than the width of the chamber 3 in which it is placed in such a manner that the heat generated in the chamber by the burners 4 can pass freely all round the apparatus in the space 16 comprised between the upper level of the glass 5 in the chamber and the lower face of the frame 12. The dipping-pipe during the drawing operation projects into the mass of molten glass a distance, as shown, of at least ¾ of the height of glass in the compartment and preferably at least one half this height which insures a mass of glass in the sheet of the proper temperature and plasticity.

The taking apparatus or dipping pipe 6 which dips with its lower parts or elements 7 in the molten glass 5 is enclosed at its upper part, above the glass by a chamber 17 which will be called hereinafter the "working chamber" and which is formed by two plates or refractory screens 18 between which are slidden plates 19 resting at their lower end on blocks 20 which rest at their outer ends upon the lateral walls 21 of chamber 3, and at their inner ends, against the sides of the frame 12 supporting the dipping pipe or taking apparatus 6. To this end, the lateral walls 21 of the chamber 3 are provided with apertures corresponding to the plates 19 completing the walls at this place.

The refractory screens 18 are suspended at 22 to rods, chains, cables or the like of a lifting device (not shown in Figs. 1 to 3); these screens slide in the apertures, already cited, of the lateral walls 21 and fit against the opposite sides of the frame 12 so as to make joint at this place. At the places where the screens pass through the arch 23 of the chamber 3, refractory plates 24 are provided so as to secure a tight joint.

Auxiliary elements, acting as joints, can further be combined with the frame 12 and with the plates 19 so as to secure a good tightness of the working chamber 17 relatively to the chamber 3. The working chamber 17 cooperates as usually with a conduit 25, of cast-iron for example, containing a lifting device 26 of any suitable construction which is diagrammatically shown in Figs. 1 to 3 but which is more detailed in Figs. 4 and 5. This lifting device is used, as it is well known, in order to carry upwards the sheet of glass as it escapes from the slit 10 of the taking apparatus 6 and is raised in the working chamber 17.

Referring now to Fig. 3, it will be observed that if the plates 19 (Fig. 1) completing the lateral walls 21 are taken away, the frame 12 and the upper part 9 of the dipping pipe 6 can be lifted by aid of the cables 15 and of the corresponding lifting device (not shown in these figures) so as to be brought to the base of conduit 25 (Fig. 3); in a similar manner the refractory screens 18 can be lifted by aid of the cables 22 and the corresponding lifting device so as to free that part of the chamber 3 which is comprised between the burners 4. During this lifting, the lower parts or elements 7 of the dipping-pipe or taking apparatus 6 which are floating in the molten glass 5, can be maintained by little refractory blocks 27 resting on the edges 28 (Fig. 3) of the apertures in the side walls 21 and fixed on said edges 28 by suitable means. At this moment the apertures in the side-walls 21 can be closed by refractory blocks 29 completing the walls and preventing any communication of the chamber 3 with the atmosphere in such a manner that the whole arrangement appears as shown in Fig. 3. In this position of the parts, the whole surface of the molten glass 5 is consequently subjected directly to the high temperature which is produced by the burners 4 and any escape of heat to the outside can be prevented by placing refractory plates 30 in the upper element 9 of the dipping pipe or taking apparatus 6.

The action of the heat on the molten glass 5 may be more or less modified by the position of the screens 18 and of the upper part 9 of the dipping pipe. The position of the parts shown in Fig. 3 corresponds to the state of rest of the apparatus between successive drawing operations and not only secures the maintenance of the mass of glass at a suitable temperature but further releases absolutely the upper part 9 of the dipping pipe from any adhering glass. The temperature in the working or drawing chamber should be slightly less than that in the melting furnace. Accordingly the drawing chamber is heated by projecting into the chamber 3, and the glass is removed at a point in which it is in a condition most suitable for drawing which is considerably below the upper level of the glass. As shown, this preferred level is less than half the height of the glass in the compartment 3, measuring from the bottom.

The apparatus works as follows:

The apparatus being in the position shown in Fig. 3 and the mass of glass 5 having been brought to the required temperature under the action of the burners 4, the refractory blocks 29 and the plates 30 are taken away and the screens 18 are lowered to their normal level whilst the upper part 9 of the dipping pipe or taking apparatus 6 is lowered unto the parts 7 with which it comes into engagement after the blocks 27 are taken away. The whole dipping pipe 6 dips then into the mass or flow 5 of molten glass and a suitable sheet or bait is then lowered into the part 9 of the dipping pipe by aid of the lifting device 25. As soon as the dipping pipe 6 has been brought in the required working position and the bait is entered into contact with the flow of glass issuing from the rectangular slit 10, the plates or refractory blocks 20 (Fig. 2) are fixed on the edge 28 of the walls 21 in such a manner that said plates or blocks rest with one end on the sides of frame 13; the plates 19 are then put into position and to this effect, are slidden between the screens 18 in order to complete the lateral walls 21 and to again close the chamber 3 whilst taking the place of the blocks 29 shown in Fig. 3. The bait is then lifted as usually by aid of the lifting device 26 and draws the glass in form of a continuous sheet at a speed depending upon the thickness of the sheet which it is desired to produce and with a width which is substantially the same as the width of the slit 10 in the upper part 9 of the dipping pipe or taking apparatus. The sheet is then raised in the working chamber 17, the walls of which are formed by the screens 18 and the plates 19 and in which it is protected against the direct action of the high heat which is produced by the burners 4. This heat, however, reaches the whole periphery of the upper part 9 of the dipping pipe in the space 16 comprised between the lower part of the frame 12 and the surface of the mass of glass 5 and, in fact, in a more or less important proportion according to the position which has been given to the screens 18, which allow, if they are sufficiently lowered control of the action of the heat in this point.

So long as the conditions of working remain the same, no change will appear in the qualities and the dimensions of the sheet which is produced.

Should a modification occur, without any evident reason in the qualities of the sheet of glass, the drawing operation is stopped and the sheet is cut just above its place of formation; the apparatus is then reestablished in the condition of rest shown in Fig.

3. To this end the plates 19 are taken away and the screens 18 are lifted as also the frame 12 carrying the upper part 9 of the dipping pipe.

If there is no important modification in the chemical composition of the flow of glass, the period of rest may be short and last only during the time which is necessary to clean the slit 10 under the action of the heat in the upper part 9 of the dipping pipe.

In the construction just described, the dipping pipe or taking apparatus 6 is placed longitudinally within the chamber 3. This apparatus, however, may also be arranged transversally in the chamber as indicated in Figs. 4 and 5 which show further, in a more detailed manner, the supporting and lifting devices for the dipping pipe 6 and the screens 18. It is only necessary in the case of a dipping pipe or taking apparatus thus arranged transversely to provide, as shown in Fig. 5, a space 31 between the ends of the taking apparatus and the lateral walls 21 of the chamber 3 for the circulation of a part of the glass-flow all around the upper part of the taking apparatus; further the arrangement must be such that the heat of the burners 4 can have access to the whole periphery of the upper part 9 of the taking apparatus at the place 16 (Fig. 5) between the upper face of the glass mass 5 and the lower part of the supporting frame 12.

In these figures 4 and 5, the lifting device for the screens 18 and the supporting frame 12 comprises a frame-work composed of vertical beams 32 connected by other horizontal beams 33 and 34. One of the upper beams 34 carries in suitable supports 35 a horizontal shaft 36 adapted to be rotated by a chain-wheel 37 and actuating through screws 38 corresponding worm-wheels 39 which are mounted on shafts 40 carrying pulleys 41 on which wind the chains 22 carrying the screens 18. At each end of the frame-work (Fig. 5) is placed a little shaft 43, adapted to rotate in a support 42 and carrying a wheel 44 on which passes a chain 45. Each shaft 43 actuates through a screw 46 a worm-wheel 47 mounted on a shaft 48 carrying two chain-wheels 49 on which pass the chains 15 supporting the frame 12 of the taking apparatus 6.

The chains 15 are connected to rods 50 provided with tightening devices 51, the rods 52 of which are connected by joints 53 (Fig. 4) to rods 54 which are pivotally connected to the ends of the bars 14 which are engaged in the grooves 13 of the supporting frame 12. This arrangement allows a very accurate regulation of the position of the dipping pipe and simultaneously gives a certain freedom of displacement to the dipping pipe in horizontal direction. On the other hand, in order to maintain the bars 14 in the grooves 13 of the supporting frame 12, the rods 54 may be connected to each other by two rods 55 (Fig. 4) and a double nut 56.

These details may be varied within wide limits without departing from the invention. The same is the case with regard to the construction of the lifting device for the glass-sheet which is supposed to be composed, in the example of Figs. 4 and 5, of two endless chains 26 passing round chain-wheels 57 which are keyed upon shafts 58 at the lower part of the conduit 25.

The chains 26 are provided at predetermined distances with grippers 59 which act upon the glass sheet during its lifting and drawing. The chains 26 are moved in any suitable way by aid of a motor supported at the upper part of the conduit 25 in which the glass sheet is gradually cooled during its lifting and drawing.

Fig. 4 shows that the upper part or element 9 of the dipping pipe or taking apparatus may be attached to the frame 12 by aid of bolts 60 and that, if it is found useful, cooling pipes 61, provided with screens 62 may be arranged above the slit 10 at the place of formation of the glass-sheet in order to lower the temperature of the sheet, in a well-known manner with a view of regulating the thickness of the sheet and of varying the speed of the drawing operation.

It will be observed that, whatever may be the arrangement of the taking apparatus or dipping pipe 6 (either longitudinally or transversely), the upper part or element 9 of this apparatus has the shape of a rectangular cup of a given depth, the bottom of which is provided with a rectangular slit 10. This part or element dips into the molten glass on a part of its height (Figs. 1 to 4) in such a manner that the upper level of the bottom lies somewhat below the upper level of the flow of molten-glass, the several sections or elements composing the lower part being dipped into the glass under the upper part or element; the frusto-conical shape of the lower sections or elements (Fig. 4) is for the purpose of allowing the calorific rays to have access to the central part below the drawing slit.

The special arrangement of the working chamber 17 formed by the screens 18, plates 19 and the upper part or element 9 of the dipping pipe or taking apparatus 6 allows, on account of its mobility, the circulation of the hot gas, produced by the burners 4, below the upper part or element 9 and above the surface of the molten glass and also along the whole periphery of the taking apparatus; this is a most important feature in order to maintain a constant and uniform plastic condition of the molten glass that is to say not only in the flow of molten glass surrounding the taking apparatus but also inside of this apparatus; it also makes it possible to take the glass in the center of the mass that is to say at such a distance from the walls of the basin that these walls cannot interfere with the flow of the glass in the drawing zone. In this respect, further, the mobility of the screens 18 allows a very accurate regulation of the hot gas all around the taking apparatus and on the surface of the molten glass contained within the chamber 3 between the burners arranged on each side of the working chamber properly so called; all these features cooperate to obtain a perfect, regular and uninterrupted drawing of the glass.

What I claim is:

1. In an apparatus for the manufacture of glass in continuous sheets, in combination, a melting furnace for the production of molten glass, a chamber communicating with said melting furnace, burners at the ends of said chamber, whereby a high temperature is produced all around the chamber, a working chamber arranged between said burners and within the said chamber, and a taking apparatus dipped in the molten glass contained in the chambers, said taking apparatus being located with its upper part in the working chamber and communicating directly at its lower end with the chamber containing the molten glass, the said working chamber and the upper part of the taking apparatus being vertically movable and separable from the lower part of the taking apparatus, whereby the hot gas from the burners may act on the whole surface of the molten glass contained in the chamber and also within the taking apparatus.

2. In combination a melting furnace for the production of molten glass, a chamber in direct communication with said melting furnace, burners arranged at the ends of this chamber, a working chamber arranged between the burners within the chamber, said working chamber comprising two vertically adjustable screens and refractory removable plates arranged between said screens, and a taking apparatus forming the bottom of said working chamber, said taking apparatus comprising an upper vertically movable part and a lower part dipped in the molten glass and means whereby the said lower part is retained in position when the upper part is in its raised position.

3. In combination a melting furnace for the production of molten glass, a chamber in direct communication with said melting furnace, burners arranged at the ends of said chambers, a working chamber arranged in said chamber, said working chamber comprising removable parts and vertically movable parts, means for displacing the said movable parts upwardly and downwardly, auxiliary refractory plates or blocks adapted to take the place of the removable parts of the working chamber in the walls of the chamber when the said parts are removed, whereby any communication of the chamber with the atmosphere can be prevented, a taking apparatus comprising an upper part forming the bottom of the working chamber and a lower part dipped in the molten glass, and means whereby the upper part of the taking apparatus can be displaced upwardly of the working chamber.

4. In combination, a melting furnace for the production of molten glass, a chamber in direct communication with said melting furnace, burners at the ends of said chamber, a working chamber arranged between the burners within the chamber, said working chamber comprising removable parts and vertically movable parts, means whereby the said movable parts can be displaced upwardly and downwardly, a frame forming the bottom of said working chamber, means whereby said frame can be moved vertically within the working chamber and a taking apparatus, supported by said frame, said taking apparatus comprising an upper cup-shaped part provided with a rectangular slit and a number of lower parts or elements dipped in the molten glass, said lower elements resting upon one another.

5. In combination a melting furnace for the production of molten glass, a chamber in direct communication with said melting furnace, burners at the ends of said chamber two vertically movable screens extending transversally in the chamber beyond its lateral walls, said screens forming with said lateral walls a working chamber between the burners, a vertically movable frame placed between said screens and a taking apparatus supported by said frame, said taking apparatus comprising an upper cup-shaped element provided with a rectangular slit and a number of lower elements, separable from the upper cup-shaped element the proportions of said taking apparatus being such relatively to the proportions of the chamber that the hot gas from the burners can circulate all round the periphery of the upper movable element below the frame supporting said upper element.

6. In an apparatus for the manufacture of glass in continuous sheets, a melting furnace for the production of molten glass, a chamber communicating with said melting furnace, burners at the ends of said chamber, whereby a high temperature is produced in the chamber, a working chamber arranged between said burners, and a taking apparatus dipped in the molten glass contained in the chamber, said apparatus extending in the molten glass to a depth not less than half the height of the molten glass, whereby the molten glass is collected at a suitable temperature and density for the drawing operation notwithstanding the high temperature maintained in the chamber.

7. In an apparatus for the manufacture of glass in continuous sheets, a chamber for molten glass, means for supplying heat to the chamber above the level of the contained glass to maintain it in the desired condition of fluidity, a working chamber extending into the upper part of said chamber, taking apparatus extending from the working chamber and opening directly into the molten glass at a depth at least three-sevenths of the height of the molten glass.

8. In an apparatus for the manufacture of glass in continuous sheets, a chamber for molten glass, means for supplying heat to the chamber above the level of the contained glass to maintain it in the desired condition of fluidity, a working chamber extending into the upper part of said chamber, taking apparatus extending from the working chamber and opening directly into the molten glass at a depth at least three-sevenths of the height of the molten glass, said taking apparatus having its upper and lower portions separable to permit of heating of the glass within the taking apparatus between sheet forming operations.

In testimony whereof I have affixed my signature in presence of two witnesses.

EUGÈNE ROWART.

Witnesses:
  JACQUE BEDE,
  EM EINARY.